(12) United States Patent
Akers et al.

(10) Patent No.: US 8,363,766 B2
(45) Date of Patent: Jan. 29, 2013

(54) DEVICE AND METHOD OF SYNCHRONIZING SIGNALS

(75) Inventors: Matthew D. Akers, Austin, TX (US); Craig D. Shaw, Austin, TX (US); Timothy K. Waldrop, Cedar Park, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1155 days.

(21) Appl. No.: 12/134,913

(22) Filed: Jun. 6, 2008

(65) Prior Publication Data
US 2009/0304134 A1   Dec. 10, 2009

(51) Int. Cl.
*H04L 7/00* (2006.01)
(52) U.S. Cl. ........................................................ 375/354
(58) Field of Classification Search .................. 375/317, 375/346, 354, 355, 359, 371, 372; 327/141, 327/144, 147, 295, 298, 363
See application file for complete search history.

(56) References Cited

U.S. PATENT DOCUMENTS

| | | | |
|---|---|---|---|
| 5,649,176 A * | 7/1997 | Selvidge et al. | 713/400 |
| 5,742,546 A | 4/1998 | Devin | |
| 5,764,966 A * | 6/1998 | Mote, Jr. | 713/400 |
| 6,108,352 A * | 8/2000 | Sferrazza et al. | 370/503 |
| 6,292,044 B1 * | 9/2001 | Mo et al. | 327/298 |
| 7,250,797 B1 | 7/2007 | Lawson | |
| 7,288,969 B1 | 10/2007 | Sleigh et al. | |
| 7,436,726 B1 * | 10/2008 | Lovejoy | 365/221 |
| 7,551,014 B1 * | 6/2009 | Wang et al. | 327/256 |
| 2003/0076145 A1 * | 4/2003 | Mawet | 327/262 |
| 2003/0210603 A1 * | 11/2003 | Ong | 365/233 |
| 2004/0246810 A1 * | 12/2004 | Dike et al. | 365/233 |

OTHER PUBLICATIONS

Cummings, Clifford E., "Simulation and Synthesis Techniques for Asynchronous FIFO Design," Sunburst Design, Inc., SNUG San Jose 2002, Rev 12, pp. 1-23.

* cited by examiner

*Primary Examiner* — David C. Payne
*Assistant Examiner* — Syed Haider

(57) ABSTRACT

A first input signal is received at a data input of first synchronizer, the first data input to be synchronized to a clock. A second input signal is received at a data input of second synchronizer, the second signal to be synchronized to the clock. Transitions are prevented from being received at a clock input of the first synchronizer and from being received at a the clock input of the second synchronizer in response to the first input signal having the same logic value as a first output signal at an output of the first synchronizer and the second input signal having the same logic value as a second output signal at an output of the second synchronizer.

18 Claims, 11 Drawing Sheets

DEVICE AND METHOD OF SYNCHRONIZING SIGNALS

BACKGROUND

1. Field of the Disclosure

The present disclosure relates generally to electronic devices and device including electronic devices, and more particularly to devices that synchronize signals.

2. Description of the Related Art

The number of different time domains that need to share information tends to increase as the size and complexity of electronic devices increases. Information from one time domain can be communicated to another time domain through a synchronization module that synchronizes the information by clocking flip-flops of the synchronization module with the clock of the receiving time domain. However, as the number of signals that need to be synchronized at a device grows, so does the number of synchronizers that need to be clocked, thereby increasing the amount of power required by the synchronization operations of a device. A device and method that reduces the amount of power used by the synchronization operation of a device would be useful.

BRIEF DESCRIPTION OF THE DRAWINGS

The present disclosure may be better understood, and its numerous features and advantages made apparent to those skilled in the art by referencing the accompanying drawings.

DETAILED DESCRIPTION

The disclosures made herein relates to devices that include electronic devices capable of processing information. In accordance with embodiments of the present disclosure, low power synchronization is used to synchronize signals between different time domains. Various embodiments of the present disclosure will be better understood with respect to FIGS. 1-10 herein.

Figure 1:
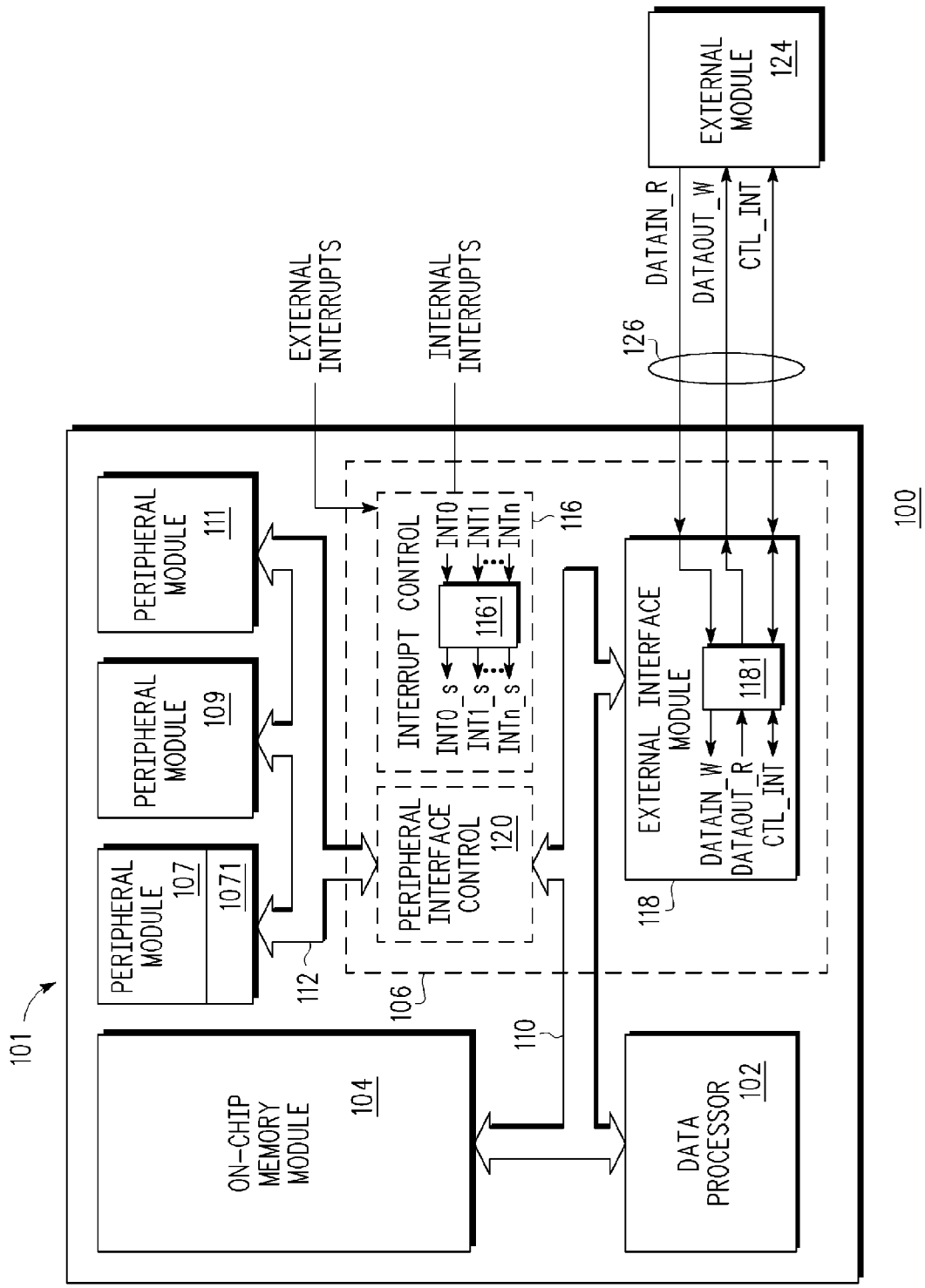
FIG. 1 illustrates an electronic device in accordance with a specific embodiment of the present disclosure.

FIG. 1 depicts a device 100 that includes an integrated circuit device 101 and an external module 124. Various devices are formed at integrated circuit device 101, including a data processor module 102, an on-chip memory module 104, an interface module 106, and a plurality of peripheral modules including peripheral module 107, peripheral module 109, and peripheral module 111 (collectively referred to herein as peripheral modules 107-111).

A first communication bus 110 is connected between the processing module 102, the on-chip memory module 104 and the interface module 106. A second communication bus 112 is connected between the integrated interface module 106 and each one of the plurality of peripheral modules 107-111. It will be appreciated that the various components illustrated at FIG. 1 may be coupled to each other through other intermediary components not illustrated. For example, the peripheral modules 107-111 can be connected to receive signals from device external to integrated circuit devices, such as from the external module 124 through connections not illustrated.

The data processor module 102 can represent an instruction based data processor that executes stored instructions, such as instructions stored at memory locations 104 or external memory locations.

The interface module 106 includes interrupt control module 116, an external interface module 118, and a peripheral interface control module 120. The external interface module 118 is connected to an external module 124 via a third communication bus 126 for providing interface functionality between the integrated circuit device 101 and the external module 124. The external module 124 is an example of an external peripheral device that can receive information from, or provide information to integrated circuit device 101. For purposes of discussion, the external module 124 is in a different time domain than the integrated circuit 101. Therefore, the external interface module 118 includes a synchronization module 1181 for synchronizing information communicated between a time domain of the external module 124 and a time domain of the integrated circuit 101. In accordance with a specific embodiment, synchronization module 1181 is implemented using a FIFO (First In First Out) memory, as discussed further at FIGS. 14 and 15, that uses synchronous interface modules of the type described further herein to synchronizer the FIFO pointers.

The peripheral interface 120 implements interface functionality between the plurality of peripheral modules 107-111 and the interface module 106. In the illustrated embodiment, the peripheral module 107 is associated with a different time domain than peripheral interface control module 120. Therefore, peripheral module 107 includes a synchronous interface module 1071 for synchronizing information communicated between the time domain of peripheral module 107 and the time domain of the peripheral interface control module 120. The interrupt controller 116 facilitates interrupt functionality between various devices. Interrupt controller 116 includes a synchronous interface module 1161 for synchronizing non-synchronous interrupt signals with the integrated circuit 101. For example, the synchronous interface module 1161 can receive interrupts from different time domains, such as from the peripheral module 108, from external module 124, from other peripheral devices external to integrated circuit device 101 (not shown), and from other devices internal to integrated circuit device 101. The interrupts from other time domains are synchronized and provided to various portions of integrated circuit device 101 for handling.

Figure 2:
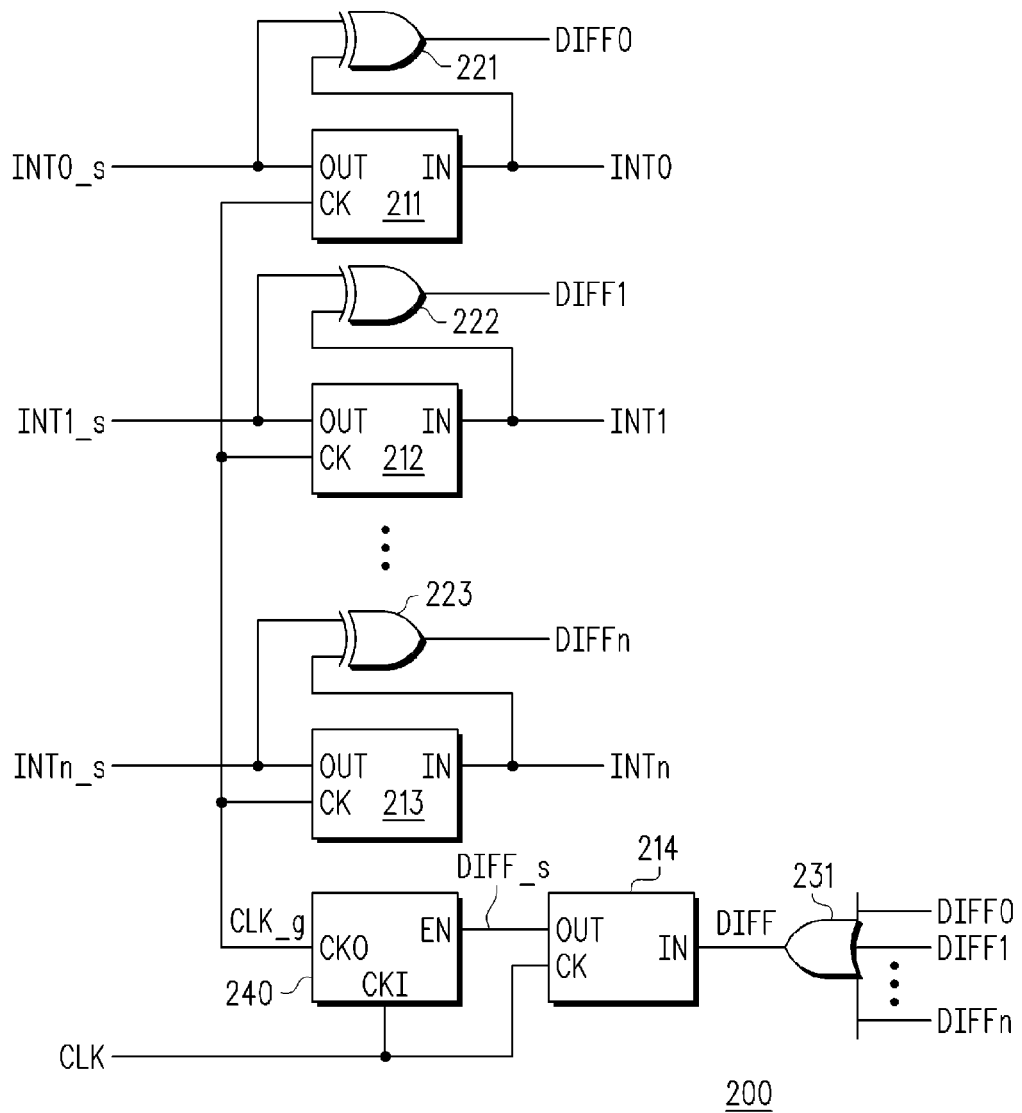
FIG. 2 illustrates a synchronization interface module of FIG. 1 in accordance with a specific embodiment of the present disclosure.

FIG. 2 illustrates a specific embodiment of a synchronous interface module 200 that can be used to implement the synchronous interface modules 1071 and 1161 of FIG. 1. For purposes of discussion herein, the synchronous interface module 200 is illustrated to synchronize interrupt signals.

The synchronous interface module 200 includes synchronizers 211-214, exclusive-or gates 221-223 (XORs 221-223), OR gate 231, and clock gating module 240. Synchronizer 211 includes an input connected to receive a signal INT0, an output to provide a signal labeled INT0_s, and a clock input to receive a clock signal labeled CLK_g. Synchronizer 212 includes an input connected to receive a signal INT1, an output to provide a signal labeled INT1_s, and a clock input to receive the clock signal labeled CLK_g. Synchronizer 213 includes an input connected to receive a signal INT2, an output to provide a signal labeled INT2_s, and a clock input to receive a clock signal labeled CLK_g. XOR gate 221 includes an input connected to the input of synchronizer 211, an input connected to the output of the synchronizer 211, and an output to provide a signal labeled DIFF0. XOR gate 222 includes an input connected to the input of synchronizer 212, an input connected to the output of the synchronizer 212, and an output to provide a signal labeled DIFF1. XOR gate 223 includes an input connected to the input of synchronizer 213, an input connected to the output of the synchronizer 213, and an output to provide a signal labeled DIFFn, where the suffix "n" represents an integer indicating the number of interrupt signals received at synchronous interface module 200. OR gate 231 includes n inputs, each respective input of OR gate 231 is connected to receive a corresponding signal of the signals DIFF0-DIFFn. OR gate 231 provides a signal labeled DIFF, which is asserted in response to any one of the signals DIFF0-DIFFn being asserted. Synchronizer 214 includes an input connected to receive signal DIFF, an output to provide a signal labeled DIFF_s, and a clock input to receive a clock signal labeled CLK. Clock gating module 240 includes an enable input connected to the output of synchronizer 214 to receive signal DIFF_s, an output to provide the signal labeled CLK_g, and an input labeled CK.

Figure 3:
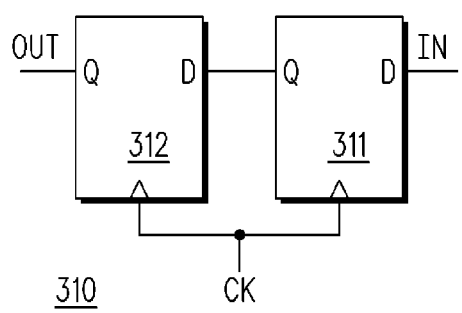
FIG. 3 illustrates a synchronizer of a synchronization interface module in accordance with a specific embodiment of the present disclosure.

FIG. 3 illustrates a specific embodiment of a synchronizer 310 that can be used to implement the synchronizers 211-214 of FIG. 2. Synchronizer 310 includes a flip-flop 311 and a flip-flop 312. Flip-flop 311 includes an input connected to an input labeled IN of the synchronizer 310, an output, and a clock input connected to an input labeled CK of the synchronizer 310. Flip-flop 312 includes an input connected to the output of the flip-flop 311, and an output connected to the output labeled OUT of synchronizer 310, and a clock input connected to an input labeled CK of the synchronizer 310. Operation of the synchronous interface module 200 using synchronizers of the type illustrated at FIG. 3 will be better understood with reference to FIGS. 4-6.

Figure 4:
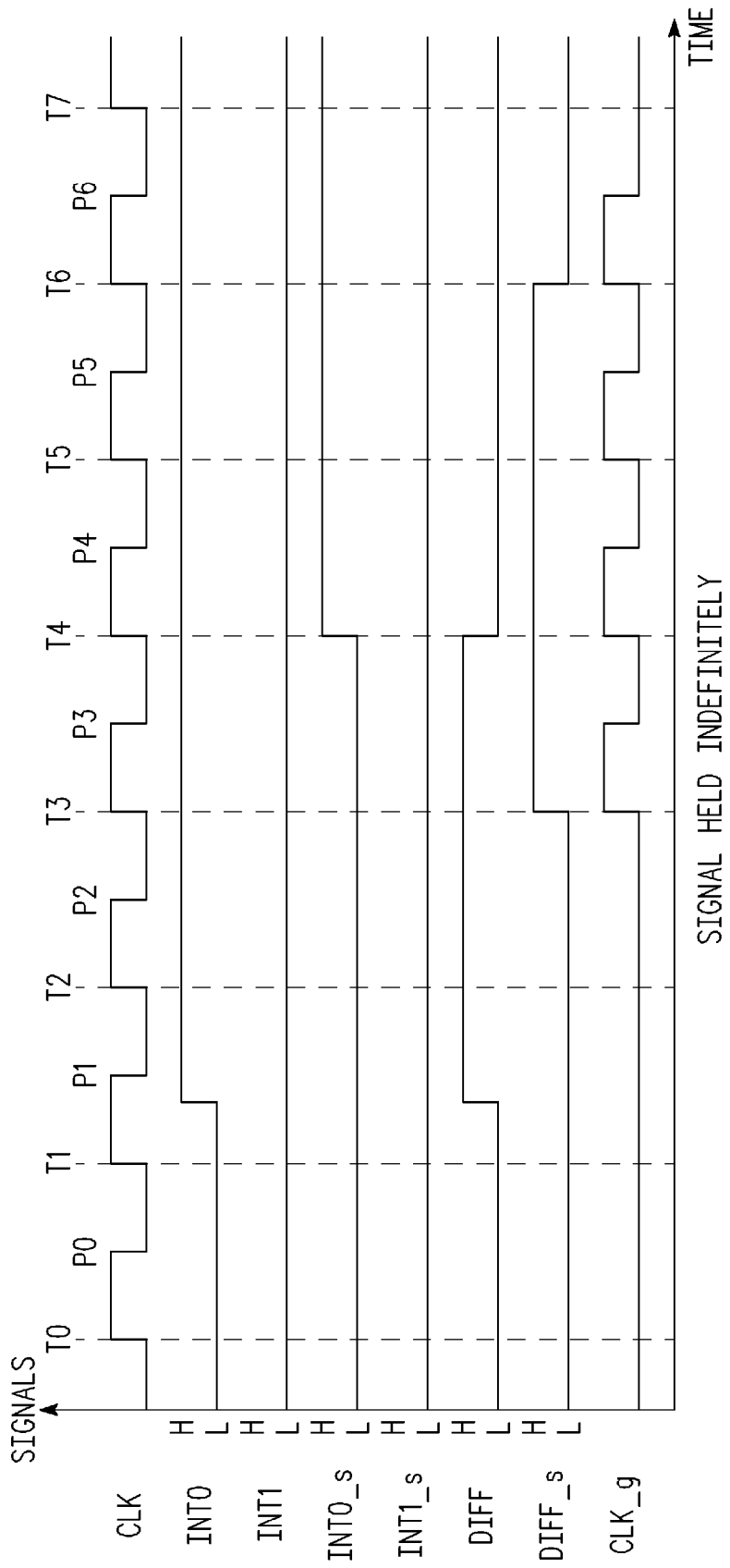
FIG. 4 illustrates a timing diagram representing operation of the synchronization interface module of FIG. 1 in accordance with a specific embodiment of the present disclosure.

FIG. 4 illustrates a timing diagram illustrating the operation of the synchronous interface module 200. Specifically illustrated at FIG. 4 are timing traces labeled CLK, INT0, INT1, INT0_s, INT1_s, DIFF, DIFF_s, and CLK_g, which correspond to commonly named signals of FIG. 2.

Signal CLK is a clock signal associated with the integrated circuit 101. Seven clock periods P0-P6 are illustrated at FIG. 4. Each respective clock period of FIG. 4 is illustrated to begin at a corresponding time T0-T6, whereby a rising edge of signal CLK also corresponds to each of times T0-T6. For example, clock period P0 begins at time T0 of FIG. 4. During time period P0 signals INT0 and INT1 both have a logic low value (L). Note unless otherwise indicated, it is assumed that all other interrupts (INT2-INTn) of FIG. 2 are at a logic low value. The state of synchronous interface module 200 at time period P0 can represent a reset state of synchronous interface module 200.

In response to the input and output signal of synchronizer 211 (INT0 and INT0_s) having the same logic value (L) at time period P0, and the input and output signal of synchronizer 212 (INT1 and INT1_s) having the same logic value (L) at time period P0, the signal DIFF0 at the output of XOR 221 and the signal DIFF1 of the output of XOR 222 will both be negated, thereby causing signal DIFF at the output of OR 231 to also be negated during time period P0. Signal DIFF can be referred to as an enable signal in that its logic value determines whether signal DIFF_s, which is provided to the enable input of clock gating module 240, is asserted or negated to enable gating of signal CLK by clock gating module 240. Negated signal DIFF at time period P0 is propagated to the output of Synchronizer 214 as negated signal DIFF_s at time period P2 in response to synchronizing signal DIFF to signal CLK using the circuit of FIG. 2. Negated signal DIFF_s operates as an enable signal that is received at the enable input of clock gating module 240, thereby preventing signal CLK_g from transitioning in response to transitions of signal CLK during time period P2.

During time period P1, signal INT0 changes logic state from a logic low value to a logic high value (H). Note that the change in logic state at signal INT0 is asynchronous to signal CLK. As a result of INT0 changing logic state at P1, the signal DIFF0 at the output of XOR 221 will be asserted at time period P1, thereby causing signal DIFF at the output of OR 231 to also be asserted during time period P1. As described further herein, signal DIFF remains asserted through time period P3. Note also that a change in logic state at INT1 at period P1 would also result in signal DIFF being asserted in response to signal IN1 having a different logic value than signal IN1_s. Asserted signal DIFF at time periods P1-P3 is propagated to the output of synchronizer 214 as asserted signal DIFF_s at time periods P3-P5 in response to synchronizing signal DIFF to signal CLK.

Asserted signal DIFF_s is received at the enable signal of clock gating module 240 at time periods P3-P5, thereby allowing clock gating module 240 to drive the signal CLK_g based upon the transitions of signal CLK so long as signal DIFF_s is asserted. Therefore, the clock input of the synchronizer 211 and the clock input of the synchronizer 212 are driven with seven transitions from time T3 through time T6 based upon transitions of signal CLK. Note that the number of transitions provided by clock gating module 240 are defined by implementation of the synchronous interface module 200, and allow the synchronizer 211 and the synchronizer 212 to propagate signals at their inputs to their outputs. For example, synchronizer 211 propagates asserted signal INT0 of time period P1 as asserted signal INT0_s of time period P3 in response to the rising transitions of signal CLK_g at times T3 and T4. Since signal INT0_s is generated based upon the rising clock edges of signal CLK, signal INT0 is referred to as being synchronized to signal CLK, and therefore can be provided in a deterministic manner to portions of integrated circuit 101 having the same time domain. For example, the interrupt module 116 of FIG. 1 can provide the synchronized signal INT0_s to the data processor 102 for handling.

In response to the input and output signal of synchronizer 211 having the same logic value (H) at time period P4, and the input and output signal of synchronizer 212 having the same logic value (L) at time period P4, the signal DIFF0 at the output of XOR 221 will be negated, thereby causing signal DIFF to also be negated during time period P4. Negated signal DIFF at time period P4 is propagated to the output of Synchronizer 214 as negated signal DIFF_s at time period P6 in response to synchronizing signal DIFF to signal CLK. Negated signal DIFF_s is received at the enable input of clock gating module 240, thereby preventing signal CLK_g, which is provided by clock gating module 240 and received at the clock inputs of synchronizer 211 and synchronizer 212, from transitioning in response to transitions of signal CLK during time period P4.

It will be appreciated that as compared to devices that drive synchronizers directly with signal CLK, synchronization module 200 reduces power consumption by driving the nodes connected to the inputs of synchronizers 211 and 212 in response to detecting a difference between a logic value at the input of a synchronizer and the output of the synchronizer.

Figure 5:
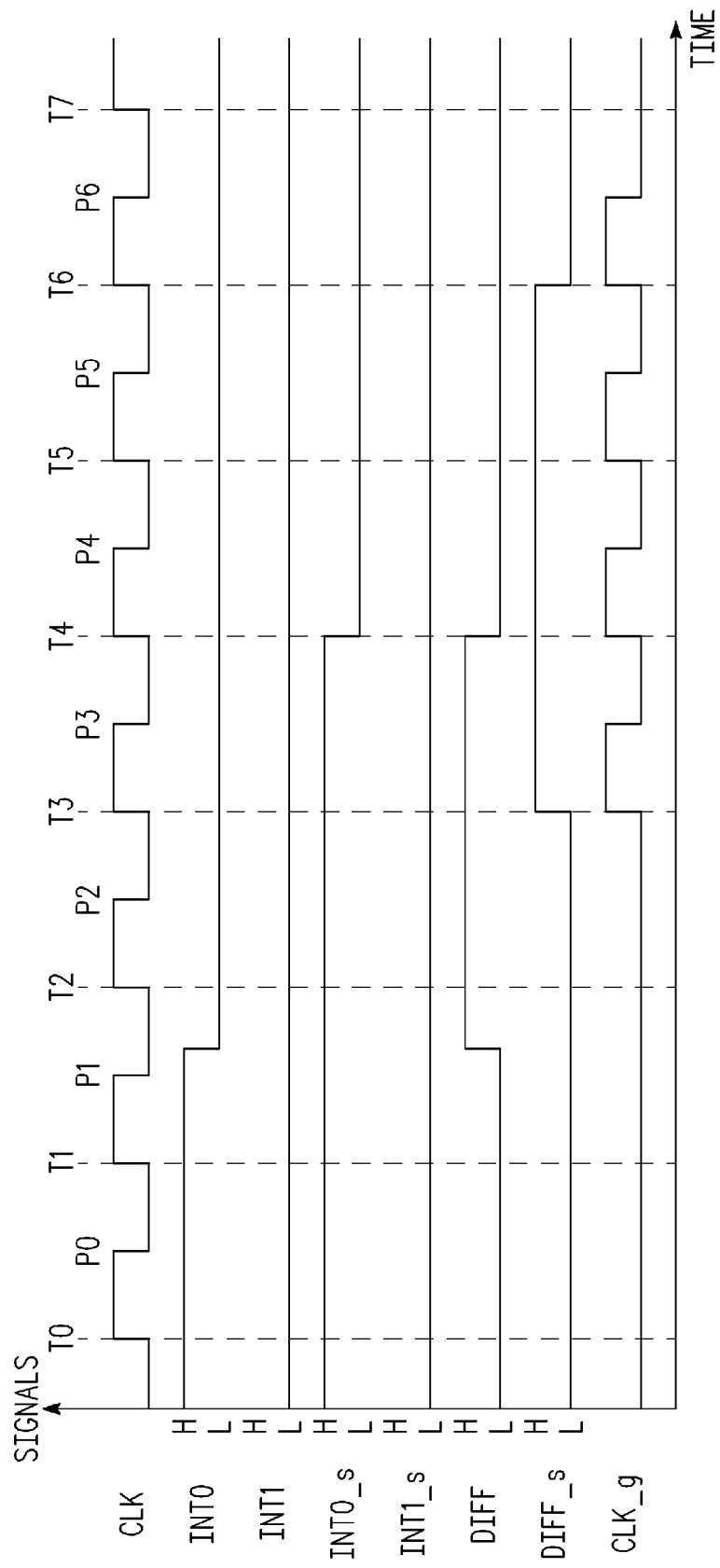
FIG. 5 illustrates a timing diagram representing operation of the synchronization interface module of FIG. 1 in accordance with a specific embodiment of the present disclosure.

FIG. 5 is a timing diagram illustrating timing traces corresponding to the same signals described at FIG. 4. The state of the signals of time period P0 of FIG. 5 corresponds to the state of the signals of time period P6 of FIG. 4. Time period P0 of FIG. 5 can represent a time period immediately adjacent to time period P6 of FIG. 4. At time period P2 of FIG. 6 signal INT0 is negated, i.e., transitions from a logic high level to a logic low level. Signal INT0 can be negated by the source of the signal INT0 in response to the interrupt being serviced, in response to the passing of a defined amount of time, and the like. Negation of the interrupt signal INT0 at time period P2 results in similar transitions of signal CLK_g as described with reference to assertion of signal INT0 at FIG. 4, thereby facilitating synchronization of signal INT0 at FIG. 5.

Figure 6:
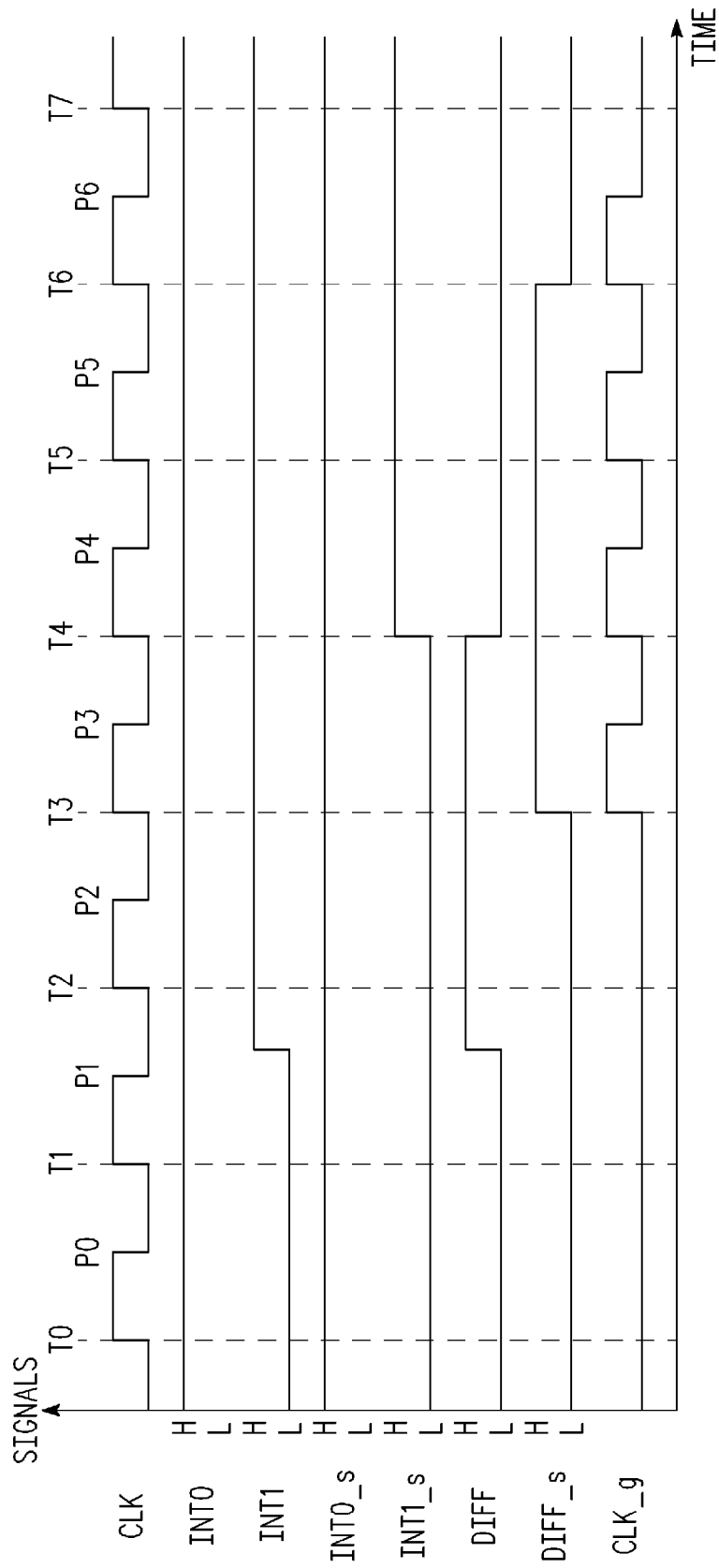
FIG. 6 illustrates a timing diagram representing operation of the synchronization interface module of FIG. 1 in accordance with a specific embodiment of the present disclosure.

FIG. 6 is a timing diagram illustrating timing traces corresponding to the same signals described at FIG. 4. The state of the signals of time period P0 of FIG. 6 corresponds to the state of the signals of time period P6 of FIG. 4. Time period P0 of FIG. 6 can represent a time period immediately adjacent to time period P6 of FIG. 4. At time period P2 of FIG. 6 signal INT1 is asserted. Signal INT1 is asynchronous to signal CLK, and as illustrated is also asynchronous to signal INT0, which may or may not change state in the same cycle as INT1, though it will be appreciated, that INT1 can be either synchronous or asynchronous to signal INT0. Assertion of the interrupt signal INT0 at time period P2 of FIG. 6 results in similar transitions of signal CLK_g as described with reference to assertion of signal INT0 at FIG. 4, thereby facilitating synchronization of signal INT1.

Figure 7:
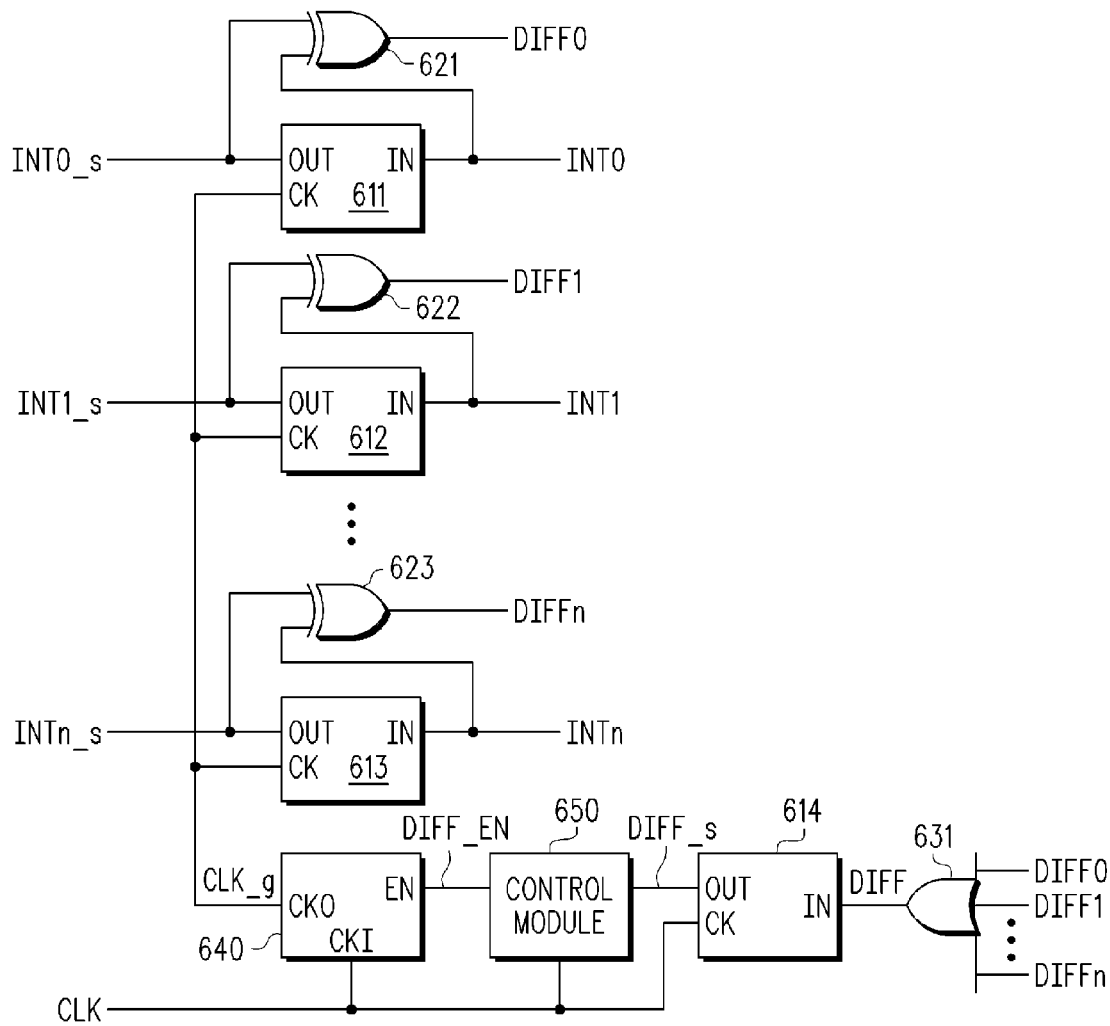
FIG. 7 illustrates a synchronization interface module of FIG. 1 in accordance with a specific embodiment of the present disclosure.

It will be appreciated that FIG. 2 illustrates a particular embodiment of a synchronous interface module that can reduce the amount of power needed to synchronize signals to a time domain identified with signal CLK, and that variations of the synchronous interface module of FIG. 2 are anticipated. For example, FIG. 7 illustrates an alternate embodiment of a synchronous interface module that can be used to implement synchronous interface modules of FIG. 1. The synchronous interface module 600 is illustrated to synchronize interrupts signals INT0-INTn for purposes of discussion.

The synchronous interface module 600 includes synchronizers 611-614, exclusive-or gates 621-623 (XORs 621-623), OR gate 631, control module 650 and clock gating module 640. Synchronizers 611-614, OR gates 621-623, and OR gate 631 are similarly connected to each other as corresponding elements of FIG. 2, i.e., synchronizers 211-214, OR gates 221-223, and OR gate 231, as previously described. Control module 650 includes an input connected to the output of synchronizer 614, an output, and a clock input connected to receive signal CLK. Clock gating module 640 includes an enable input connected to the output of control module 650, an output to provide the signal CLK_g, and an input to receive the signal CLK.

Figure 8:
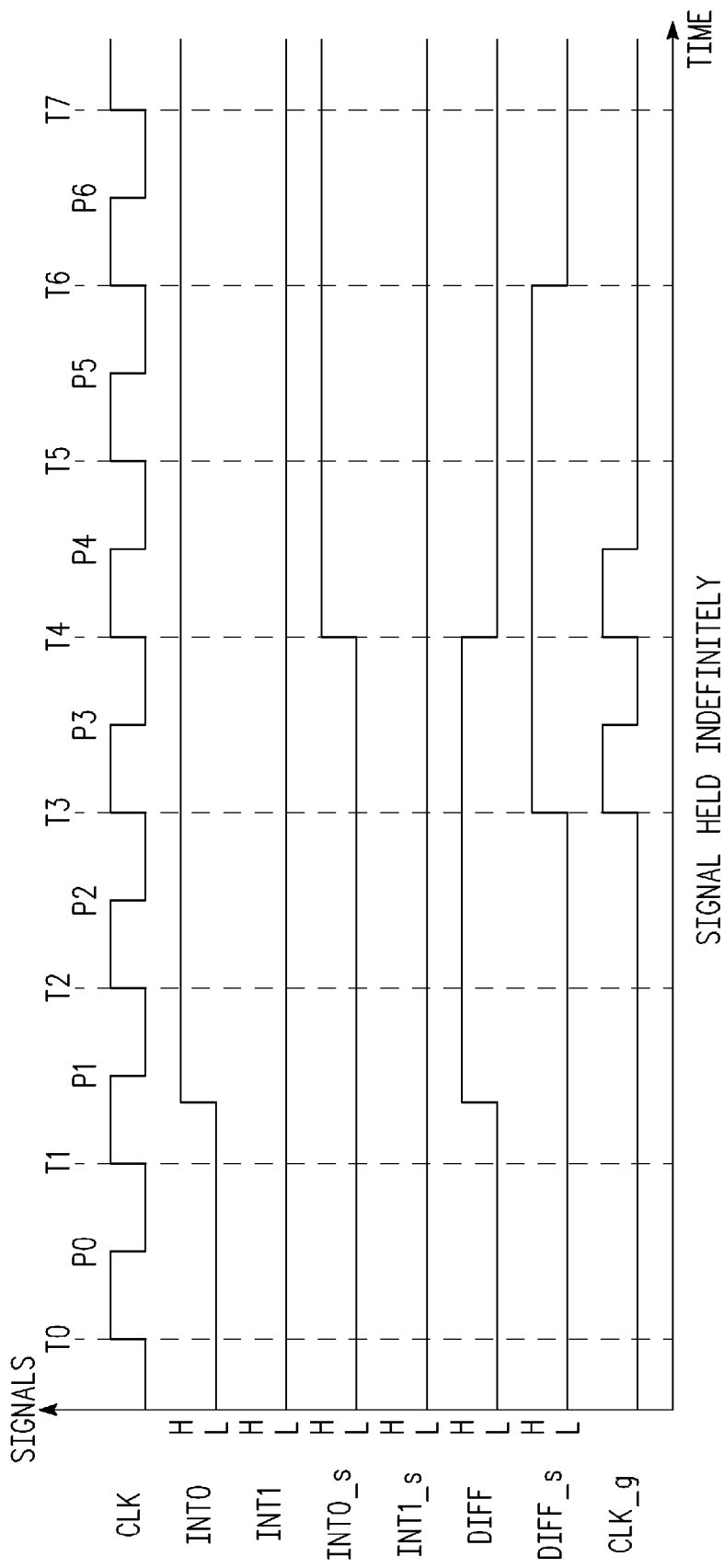
FIG. 8 illustrates a timing diagram representing operation of the synchronization interface module of FIG. 1 in accordance with a specific embodiment.

The control module 650 communicates with the clock gating module 640 to control the transitions of signal CLK_g differently than synchronous interface module 200. For example, the control module 650 can allow for a different number of pulses to be generated at signal CLK_g during operation. The timing diagram of FIG. 4 indicates that synchronous interface module 200 will generate a defined number of eight transitions at CLK_g in response to a difference between the input and the output of a synchronizer being held for at least three rising edges. Control module 650 can be used to limit the transitions of CLK_g to only four transitions. For example, FIG. 8 illustrates assertion of signals CLK, INT0, and INT1 in the same manner described at FIG. 4, but results in four transitions, instead of eight, based upon a specific implementation of the control module 650 FIG. 7, thereby reducing power consumption by reducing the number of times signal CLK_g transitions.

Figure 9:
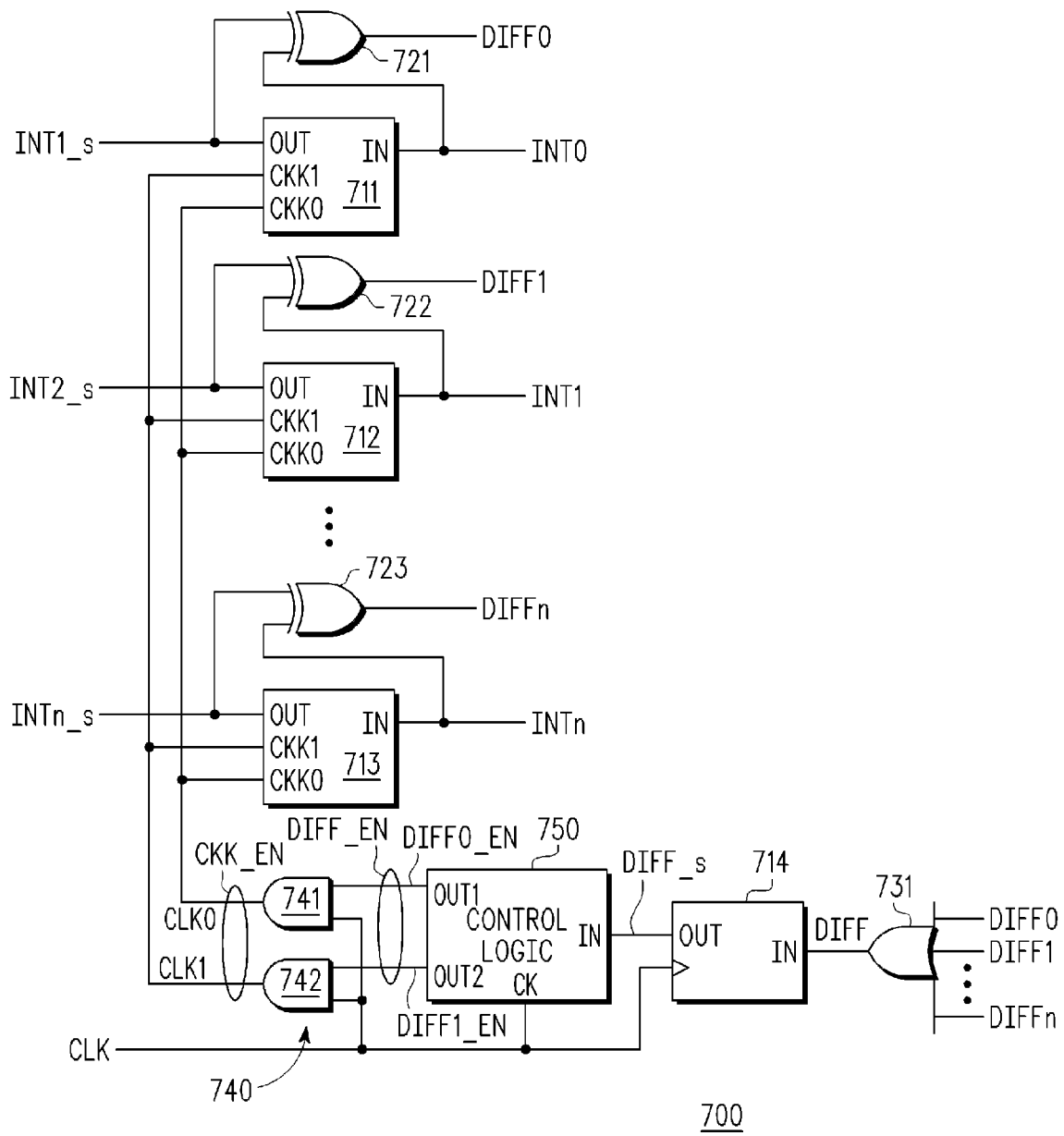
FIG. 9 illustrates a synchronization interface module of FIG. 1 in accordance with a specific embodiment of the present disclosure.

FIG. 9 illustrates a synchronous interface module 700 that is an alternate implementation of a synchronous interface module. Synchronization module 700 includes synchronizers 711-714, exclusive-or gates 721-723 (XORs 721-723), OR gate 731, control module 750 and clock gating module 740. A specific embodiment of synchronizers 711-714 of FIG. 7 is illustrated in greater detail at FIG. 11.

Figure 11:
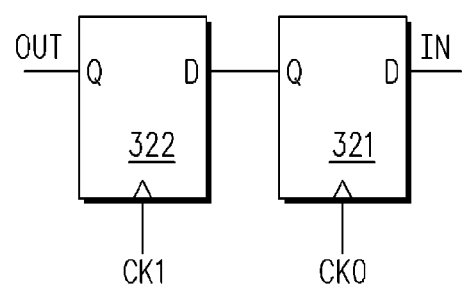
FIG. 11 illustrates a synchronizer of a synchronization interface module in accordance with a specific embodiment of the present disclosure.

Synchronizer 320 of FIG. 11 includes a flip-flop 321 and a flip-flop 322. Flip-flop 321 includes an input connected to an input labeled IN of the synchronizer 320, an output, a clock input connected to an input labeled CK0 of the synchronizer 320, and a clock input connected to an input labeled CK1 of the synchronizer 320. Flip-flop 322 includes an input connected to the output of the flip-flop 321, and an output connected to the output labeled OUT of synchronizer 320, a clock input connected to an input labeled CK1 of the synchronizer 320.

Figure 10:
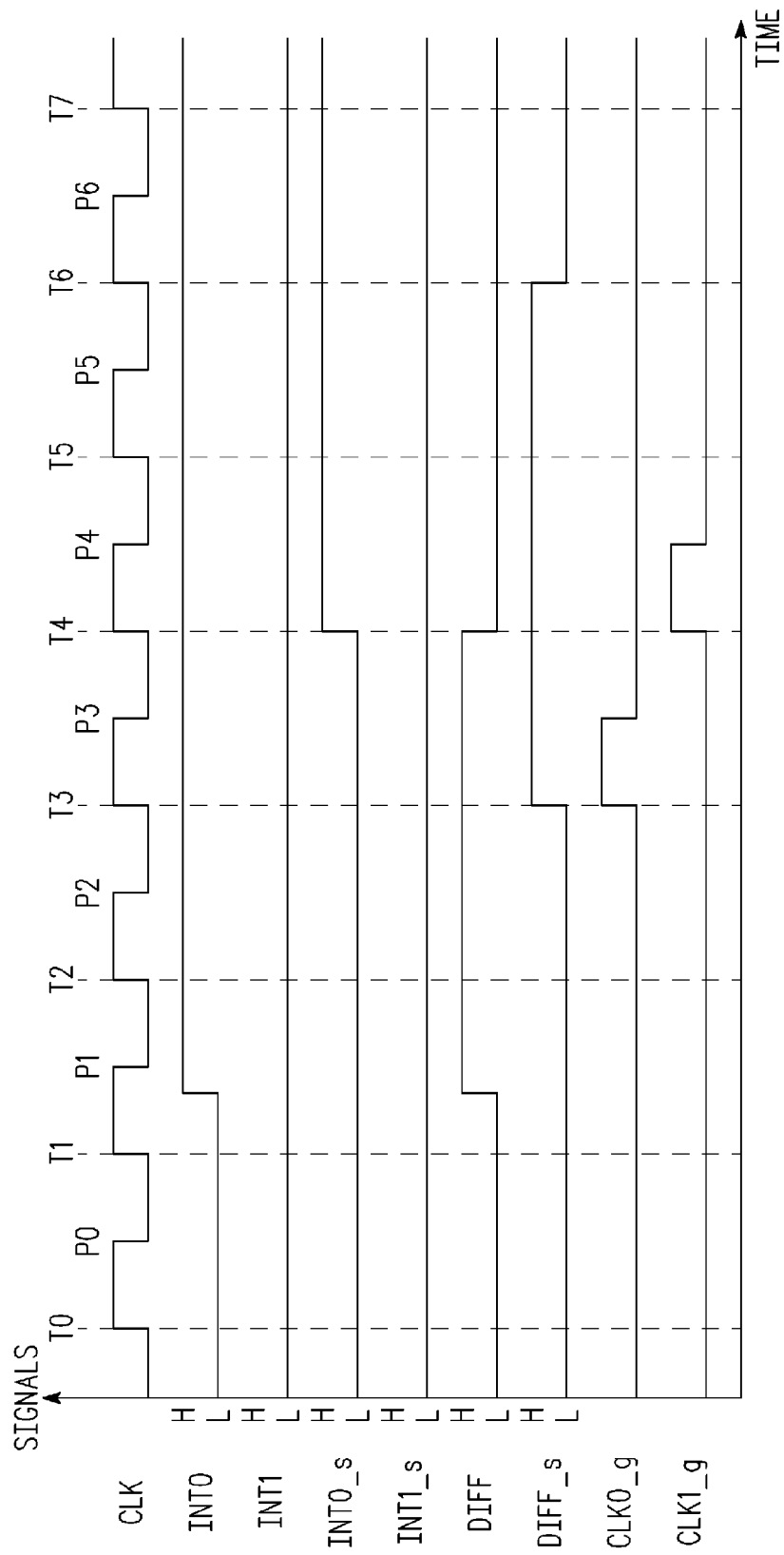
FIG. 10 illustrates a timing diagram representing operation of the synchronization interface module of FIG. 1 in accordance with a specific embodiment.

Referring to FIG. 9, Synchronizers 711-714, OR gates 721-723, OR gate 731, and control module 750 are similarly connected to each other as corresponding elements of FIG. 6, i.e., synchronizers 611-614, OR gates 621-623, OR gate 631, and control module 750 as previously described. The signal DIFF_EN of control module 750 includes two separate enable signals, DIFF0_EN and DIFF1_EN. Clock gating module 740 includes AND gate 741 and AND gate 742. One of the enable signals from control module 750 is provided to a first input of AND gate 741, and the other enable signal from control module 750 is provided to a first input of AND gate 742. The signal CLK is provided to a second input of AND gate 741, and to a second input of AND gate 742. AND gate 741 provides a signal CLK1_g, while AND gate 742 provides signal CLK2_g. As illustrated at FIG. 9, control module 750 controls clock gating module 740 in such a manner to provide a single pulse to clock input CLK0 of synchronizers 711-713, followed by a single pulse to clock input CLK1 of synchronizers 711-713 to synchronize the interrupts signal INT0-INTn to signal CLK. For example, FIG. 10 illustrates assertion of signals CLK, INT0, and INT1 in the same manner described at FIG. 4, but resulting in four transitions, instead of six, based upon a specific implementation of FIG. 9, thereby reducing power consumption by reducing the number of times signals CLK0_g and CLK1_g transition.

Figure 12:
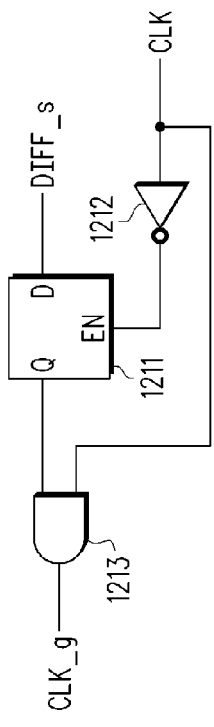
FIG. 12 illustrates a clock gating module of a synchronization interface module in accordance with a specific embodiment of the present disclosure.

FIG. 12 illustrates a clock gating module 1200 that can represent the clock gating module 240 of FIG. 2. The clock gating module 1200 includes a transparent latch 1211, an inverter 1212, and an AND gate 1213. The transparent latch 1211 includes an enable input, a data input to receive the signal DIFF_s, and an output. The inverter includes an input to receive the signal CLK, and an output connected to the enable input of the transparent latch 1211. The AND gate includes an input connected to the output of the transparent latch 1211, an input to receive the signal CLK, and an output to provide the signal CLK_g.

Figure 13:
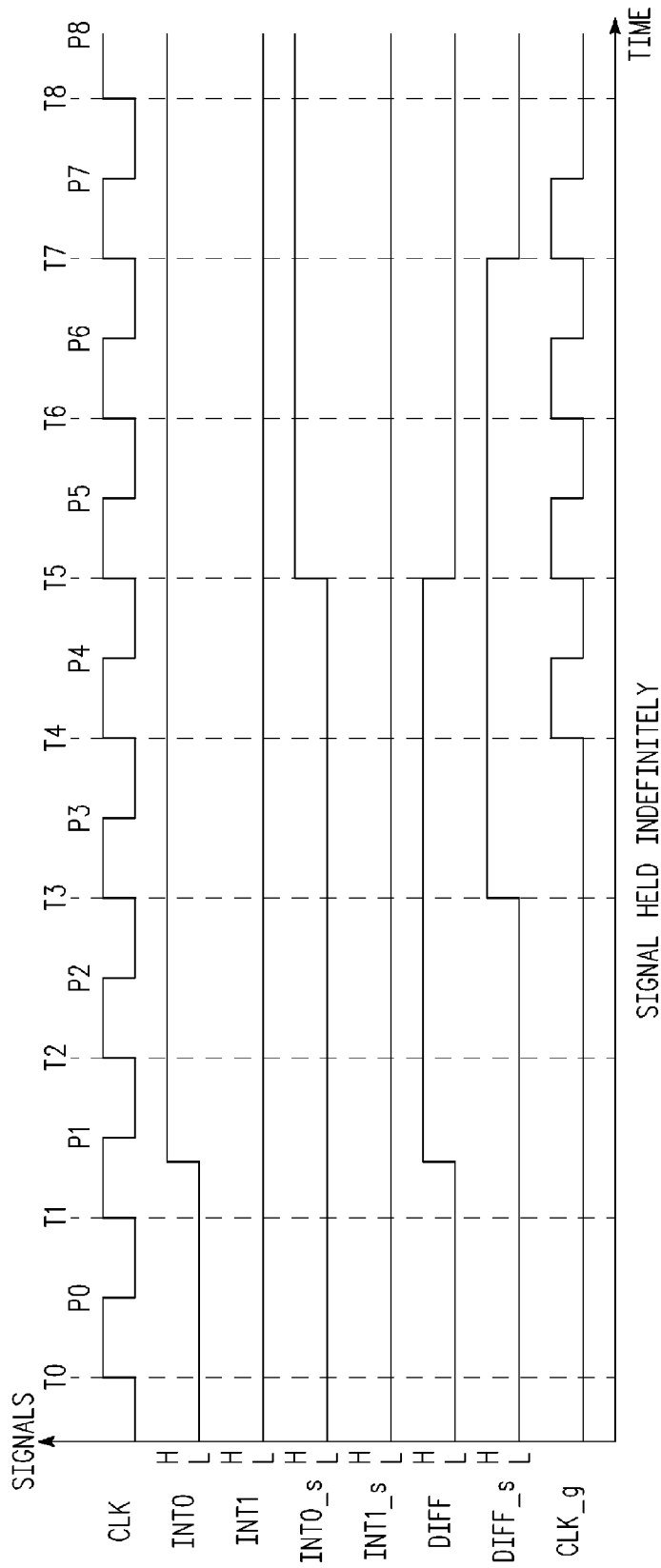
FIG. 13 illustrates a timing diagram representing operation of the synchronization interface module of FIG. 1 in accordance with a specific embodiment.

FIG. 13 illustrates a timing diagram representative of the operation of a the synchronization device of FIG. 2 when the clock gating module 1200 is used. Specifically, four pulses, i.e., eight signal transitions, on signal CLK_g occur that correspond to rising edges of signal CLK during time periods P4-P7.

In the preceding detailed description, reference has been made to the accompanying drawings that form a part hereof, and in which are shown by way of illustration specific embodiments in which the disclosures may be practiced. These embodiments and certain variants thereof, have been described in sufficient detail to enable those skilled in the art to practice the invention. It is to be understood that other suitable embodiments may be utilized and that logical, mechanical, chemical and electrical changes may be made without departing from the spirit or scope of the invention. For example, embodiments of FIGS. 2-13 of the disclosure have been described with respect to interrupt signals. However, it will be appreciated that other signal types can be synchronized using synchronization modules as described herein. For example, FIGS. 14 and 15 illustrate a specific embodiment of a synchronizer module 1181 that passes information between an external module 124 and the external interface module 118 of integrated device 101.

Figure 14:
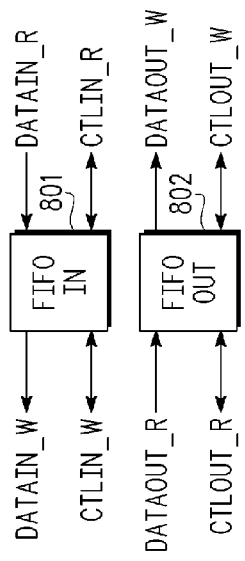
FIG. 14 illustrates a FIFO using synchronization interface modules as disclosed herein.

FIG. 14 illustrates a specific embodiment of a synchronization module 1181 of FIG. 1 that can operate as a gray code FIFO, which increments and decrements pointers based upon gray code to store and retrieve information from the FIFO memory to pass information across time domain boundaries. Specifically illustrated at FIG. 14 is a FIFO 801 is used to pass information, DATAIN_R, from external module 124 to external interface module 181 as DATAIN_W, and a FIFO 802 used to pass information, DATAOUT_R from external interface module 181 to external module 124 as DATAOUT_W. Control signals CTLIN_R and CTLOUT_W are represented in FIG. 1 by signals CNTL_EXT, which provide an interface with external module 124, while control signals CTLIN_W and CTLOUT_R are represented in FIG. 1 by signals CNTL_INT, which provide an interface with external interface module 118. FIG. 15 illustrates a specific embodiment of FIFO 802 that synchronizes outbound data packets from external interface module 802 to external module 124.

Figure 15:
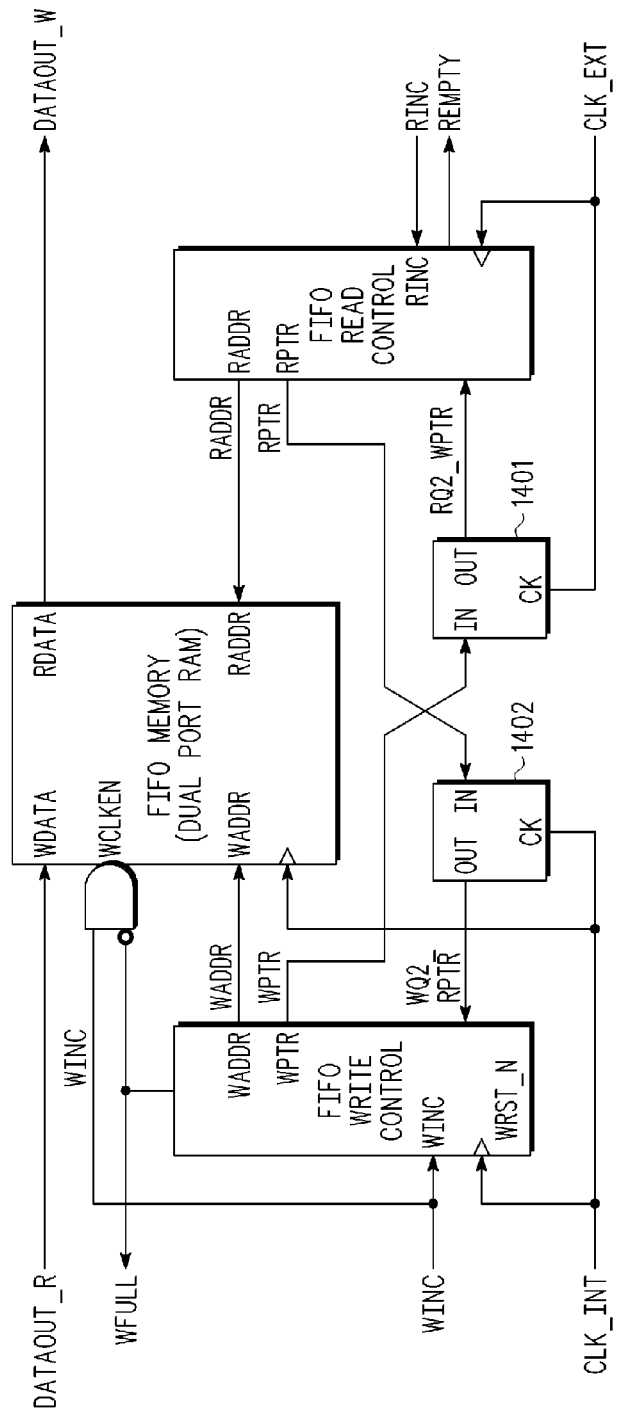
FIG. 15 illustrates a FIFO using a synchronization interface module as disclosed herein.

FIG. 15 illustrates a specific embodiment of FIFO 802 having three control signals that interface with the external interface module 181 and three control signals that interface with the external module 124. Signals WCLK, WINC and WFULL interface with the external interface module 181, and signals RCLK, REMPTY, and RINC interface with the external module 124. FIFO 802 includes synchronous interface modules 1401 and 1402 that can operate as described herein to synchronize and pass read and write pointers across time domain boundaries to facilitate passing information through the FIFO memory. For example, based upon an asserted signal WINC, and assuming the FIFO is not full, the FIFO write control module of FIG. 14 will store information DATAOUT_R at address WADR of the FIFO memory in response to an internal clock (CLK_INT), determine whether the FIFO is full, assert signal WFULL if the FIFO is full to prevent storing additional data at the FIFO, and increment a current write pointer, WPTR, that is passed to the read control FIFO via the synchronizer 1401 to update the location of the current write pointer. The size of the pointer is based upon the size of the FIFO MEMORY and can be a gray code pointer, whereby only one digit of the pointer changes for each increment or decrement of the FIFO. Similarly, based upon an asserted signal RINC, and assuming the FIFO is not empty, the FIFO read control module will retrieve information DATAOUT_W at address RADDR of the FIFO memory in response to an external clock CLK_EXT, assert signal REMPTY if the FIFO is empty, and decrement and pass the current read pointer, RPTR, that is passed to the FIFO write controller via the synchronizer 1402 to update the location of the current read pointer.

It will be appreciated that a second FIFO, similar to the FIFO of FIG. 15 can be used to pass data from the external module 124, e.g. DATAIN_R, to the external interface module 118, e.g., DATAOUT_R.

Based upon the description herein, it will be appreciated that the preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method comprising:
receiving a first input signal at a data input of a first synchronizer, the first input signal to be synchronized to a clock;
receiving a second input signal at a data input of second synchronizer, the second input signal to be synchronized to the clock;
preventing a transitioning third signal based upon preventing the clock from being received at a clock input of the first synchronizer and from being received at a clock input of the second synchronizer in response to the first input signal having the same logic value as a first output signal at an output of the first synchronizer and the second input signal having a same logic value as a second output signal at an output of the second synchronizer;
asserting an enable signal in response to determining that the first input signal has changed logic state or that the second input signal has changed logic state, wherein the first input signal has changed logic state when the first input signal has a different logic value than the first output signal at the output of the first synchronizer, and the second input signal has changed logic state when the second input signal has a different logic value than the second output signal at the output of the second synchronizer, wherein the first output signal is based upon a value of the first input signal at a previous time and the second output signal is based upon a value of the second input signal at the previous time, and wherein the enable signal is asynchronous to the clock; and
synchronizing the enable signal to the clock to generate a synchronized enable signal;

wherein preventing includes preventing transitioning of the third signal based upon the synchronized enable signal.

2. The method of claim 1 further comprising:
driving the clock input of the first synchronizer and driving the clock input of the second synchronizer with signal transitions based upon signal transitions of the clock in response to the first input signal having a different logic value than the first output signal.

3. The method of claim 2, further comprising:
driving the clock input of the first synchronizer and driving the clock input of the second synchronizer with signal transitions based upon the clock in response to the second input signal having the different logic value than the second output signal.

4. The method of claim 2, wherein driving the clock inputs further comprises: driving the clock input of the first synchronizer and the clock input of the second synchronizer with a defined number of signal transitions based upon the clock in response to the first input signal having the different logic value than the first output signal.

5. The method of claim 2, wherein the clock input of the first synchronizer is a first clock input of the first synchronizer, the clock input of the second synchronizer is a first clock input of the second synchronizer, and wherein driving the clock inputs further comprises:
driving the first clock input of the first synchronizer and the first clock input of the second synchronizer with a set of signal transitions based upon a first set of transitions of the clock, and driving a second clock input of the first synchronizer and a second clock input of the second synchronizer with a set of signal transitions based upon a second set of transitions of the clock.

6. The method of claim 5, wherein the set of signal transitions based upon the first set of transitions form a single clock pulse at the first clock input, and the set of signal transitions based upon the second set of transitions form a single clock pulse at the second clock input.

7. The method of claim 1, wherein the first input signal and the second input signal are asynchronous to each other.

8. The method of claim 7, wherein the first input signal and the second input signal are interrupt signals.

9. The method of claim 1, wherein the first input signal is asynchronous to the clock, and the second input signal is asynchronous to the clock.

10. The method of claim 9, wherein the first input signal and the second input signal are address signals to address a memory.

11. The method of claim 9, wherein the first input signal and the second input signal are grey code address signals used to access information at a grey code first-in first-out memory.

12. The method of claim 1, wherein the first input signal and the second input signal are interrupt signals.

13. The method of claim 9, wherein the first input signal and the second input signal are asynchronous to each other.

14. A device comprising:
a first node to receive a clock signal;
a clock gating module comprising a first input connected to the first node, a second input to receive a signal based upon an enable signal, and an output to drive signal transitions at a second node based upon the clock signal in response to the enable signal being at a second logic value and to prevent signal transition at the second node in response to the enable signal being at a first logic value;
a first synchronizer comprising an input to receive a first signal asynchronous to the clock signal, a clock input to receive a signal based upon a signal at the second node, and an output to provide a second signal synchronous to the clock signal, the second signal based upon the first signal;
a second synchronizer comprising an input to receive a third signal asynchronous to the clock signal, a clock input to receive the signal based upon the signal at the second node, and an output to provide a fourth signal synchronous to the clock signal, the fourth signal based upon the third signal; and
a logic module comprising a first input coupled to the input of the first synchronizer, a second input coupled to the output of the first synchronizer, and an output to provide an enable signal having the second logic value in response to the logic value at the input of the first synchronizer being different than the logic value at the output of the first synchronizer, and the logic module further comprising a third input coupled to the input of the second synchronizer, a fourth input coupled to the output of the second synchronizer, and the output to provide the enable signal having the second logic value in response to the logic value at the input of the second synchronizer being different than the logic value at the output of the second synchronizer.

15. The device of claim 14, further comprising a plurality of synchronizers, including the first synchronizer, each synchronizer of the plurality of synchronizers including a corresponding input and a corresponding output, and wherein the logic module is further to provide the enable signal having the first logic value in response to each respective synchronizer of the plurality of synchronizers having the same logic value at its corresponding input as at its corresponding output.

16. A method comprising:
receiving a plurality of signals at a plurality of synchronization modules, the plurality of signals to be synchronized to a clock, each respective signal of the plurality of signals received at a corresponding synchronization module of the plurality of synchronization modules, and each of the plurality of synchronization modules providing a corresponding synchronized signal;
preventing the plurality of synchronization modules from receiving a transitioning signal during a first time period in response to each respective synchronization module of the plurality of synchronization modules having its corresponding received signal having a same logic value as its corresponding provided signal; and
driving a first synchronization module of the plurality of synchronization modules with a transitioning signal based upon the clock during a second time period in response to a first synchronization module of the plurality of synchronization modules having its corresponding received signal having a different logic value as its corresponding provided signal.

17. The method of claim 16, further comprising:
driving a first clock input of the first synchronization module of the plurality of synchronization modules and a first clock input of a second synchronization module of the plurality of synchronization modules with a set of signal transitions based upon a first set of transitions of the clock, and driving a second clock input of the first synchronization module and a second clock input of the second synchronization module with a set of signal transitions based upon a second set of transitions of the clock.

18. The method of claim 1 further comprising:

transitioning the third signal based upon the clock being received at the clock input of the first synchronizer and at the clock input of the second synchronizer in response to the first input signal having a different logic value than the first output signal at the output of the first synchronizer and the second input signal having a different logic value than the second output signal at the output of the second synchronizer.

* * * * *